United States Patent [19]
Fan

[11] Patent Number: 6,089,274
[45] Date of Patent: Jul. 18, 2000

[54] I-TYPE COUNTERFLOW ABSORBER

[76] Inventor: Jui-Hua Fan, No. 38-1, Sec. 2, Yung An S. Rd. LuChou Hsiang, Taipei, Taiwan

[21] Appl. No.: 09/371,961

[22] Filed: Aug. 11, 1999

[51] Int. Cl.⁷ ................................................ F16L 55/045
[52] U.S. Cl. ................................ 138/31; 138/43; 138/45; 138/46
[58] Field of Search ................................ 138/30, 31, 43, 138/44, 45, 46

[56] References Cited

U.S. PATENT DOCUMENTS

| | | | |
|---|---|---|---|
| 1,724,881 | 8/1929 | Lund | 138/46 |
| 2,324,391 | 7/1943 | Hersey | 138/46 |
| 2,612,576 | 9/1952 | Lange | 138/31 |
| 2,809,666 | 10/1957 | Judd | 138/31 |
| 3,695,297 | 10/1972 | Ferrentino | 138/30 |
| 3,948,285 | 4/1976 | Flynn | 138/30 |
| 4,037,625 | 7/1977 | Mott | 138/31 |
| 4,177,023 | 12/1979 | Kamiya et al. | 138/31 |
| 4,564,338 | 1/1986 | Ilg | 138/39 |
| 4,770,212 | 9/1988 | Wienck | 138/46 |
| 5,638,868 | 6/1997 | Loran | 138/30 |

*Primary Examiner*—James Hook
*Attorney, Agent, or Firm*—Dougherty & Troxell

[57] ABSTRACT

An I-type counterflow absorber for directly connecting with a piping system to absorb the impact force and noise resulting from water hammering in the piping system. It includes an outer tube, an inner tube, a valve seat, a valve and an annular piston board. The outer tube includes a front tube and a rear tube. The valve seat is located between the front tube and the rear tube and has a funnel groove and a passage formed therein. The inner tube is located in the rear tube and has one end engaging with one side of the funnel groove. The valve includes a valve engageable with another side of the funnel groove. The piston board is located between the inner tube and the rear tube for separating the space between the inner tube and outer tube in a buffer zone and an air chamber filled with air.

9 Claims, 4 Drawing Sheets

I-TYPE COUNTERFLOW ABSORBER

BACKGROUND OF THE INVENTION

1. Field of the Invention

The invention relates to an I-type counterflow absorber and particularly to a counterflow absorber to directly connect with a water piping system for absorbing counterflow water hammering effect.

2. Description of the Prior Art

It is generally know that in a water piping system a water hammering phenomenon will take place when a valve is open or close abruptly and results in producing intermittent or continuous impact force. The valve may be a counterflow valve, a solenoid valve or a floating valve. Besides opening or closing of a valve, the abrupt start or stop of a pump, or improper piping configuration could also create water hammering effect which tends to damage piping elements and equipment, and will shorten their service life.

There are a great deal of improvements and innovations in the design and construction of contemporary high rise buildings. However little improvement has been made in the piping system built in them. A piping network (such as a water piping system) usually is constructed bottom up. A pumping system is employed to overcome gravity force and to pump water to the top of the building. The power of the pump is almost equal to the water hammering force. When a pump is abruptly stop, water hammer, because of gravity and acceleration, impacts on the pump with great force. It could easily damage the pump to useless. While a conventional counterflow valve or solenoid valve might prevent water from counterflowing, it does not help much in reducing the impact force of water hammering or the noise incurred. Furthermore, water hammering could also create leakage problem and easily results in lack or no water supply in certain areas of a building.

Applicant has disclosed an I-type counterflow absorber in U.S. Pat. No. 5,819,802 that may directly connect with a piping system for absorbing water hammering. It has an air chamber in which air pressure may be adjusted to suit different requirements such as different height of the building. It may also be installed in the middle of a piping system. More than one absorber may be installed in a long piping system (such as for a building of thirty stories or more). It may be used more flexibly and makes piping configuration and design simpler. It also provides better protection for the equipments and facilities at the pipe end.

However the counterflow absorber disclosed in U.S. Pat. No. 5,819,802 does not have well structured positioning means among the components. The components have to rely on adhering, soldering or welding to fasten and assemble together. More over the outer tube is a closed structure which makes assembly of components therein difficult.

Production time and cost are higher. It also includes a large number of components that also increase cost. As the components are fixedly installed inside the outer tube by adhering, soldering or welding, repair and maintenance become very difficult. The whole absorber should be replaced because of breakdown of a small item such as an O-ring. It greatly increases operation and maintenance costs.

SUMMARY OF THE INVENTION

In view of aforesaid disadvantages, it is an object of this invention to provide a counterflow absorber which may be installed directly in a piping system for absorbing water hammering and which has small number of components and better positioning structure that is easier to construct and assemble without adhering, soldering or welding. Material and production costs may become lower, and repair and maintenance is simpler and less costly.

In one aspect of this invention, the I-type counterflow absorber includes an outer tube, a valve seat, an inner tube, a valve means and a piston board. The outer tube constitutes a front tube and a rear tube for connecting with a piping system. The valve seat is located between the front tube and rear tube, and has a funnel groove and a passage formed therein. The valve means is located in the front tube and has a valve engageable with the funnel groove. The piston board is located between the inner tube and the rear tube for forming a buffer zone and an air chamber in a space formed by the inner tube and rear tube. The components have simple structures and may be made easily at low costs. The components may be assembled to modules for final assembly without adhering, soldering or welding. Production time and cost thus may able greatly reduced. Repair and maintenance time and cost are also lower.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 1:
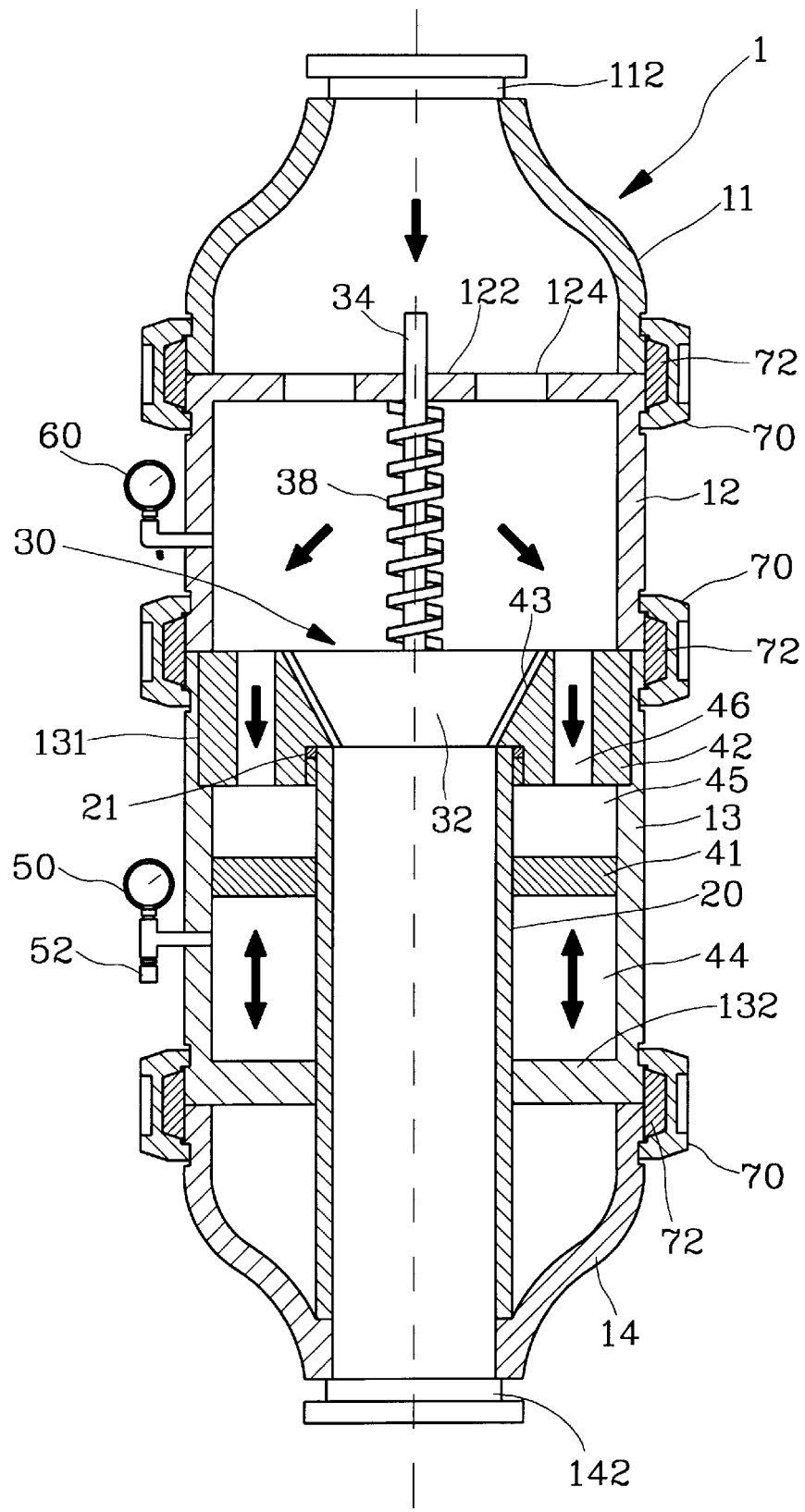
FIG. 1 is a sectional view of a first embodiment of this invention.

Referring to FIG. 1, the I-type counterflow absorber according to this invention may be installed in a piping system directly for absorbing impact force and noise created by water hammering. It includes a hollow outer tube, an annular valve seat 42, an inner tube 20, a valve means 30 and an annular piston board 41.

The outer tube includes a front tube 12 and a rear tube 13 fastened together by means of a fastener, preferably a mechanical coupler 70. A first seal ring 72 may be disposed in the mechanical coupler 70 for preventing leakage.

Inside the rear tube 13 and adjacent the front tube 12, an annular holding groove 131 is formed which has an inside diameter equal to the outside diameter of the valve seat 42 for holding the valve seat 42 therein securely. The valve seat 42 divides the interior of the outer tube in a front and a rear section. The valve seat 42 has a funnel groove 43 in the center and at least one passage 46 around the funnel groove 43 for communicating with the front and rear section. The inner tube 20 is smaller size than the inside diameter of the rear tube 13 and is axially held in the rear tube 13 with one end engaging with the valve seat 42 and another end passing through a closed end 132 of the rear tube 13 to form a fluid passage with the funnel groove 43 and the front tube 12. A second seal ring 21 may be provided at the end of the inner tube 20 to engage with the valve seat 42 for preventing leakage.

The valve means 30 is located in the front tube 12 and includes a valve 32, a valve stem 34 and a spring 38 surrounding the valve stem 34. The valve 32 is engageable with the funnel groove 43 under the force of the spring 38. The stem 34 is movable axially through a first bracket 122 located at one end of the front tube 12. The first bracket 122 further has at least one opening 124 to allow water flowing therethrough. The valve 32 may be pushed and disengaged with the funnel groove 43 under external force.

The piston board 41 is located between the inner tube 20 and the rear tube 13 and divides the space between the inner tube 20 and the rear tube 13 in a buffer zone 45 which communicates with the passage 46 and an air chamber 44 filled with air. There is a water flow pressure meter 60 attached to the front tube 12 from outside for sensing water flow pressure vibration in the piping system. There is an air pressure gauge 50 attached to the rear tube 13 from outside and communicating with the air chamber 44 for measuring air pressure in the air chamber 44. The air pressure gauge 50 further has an air nozzle 52 attached thereon for releasing air from or injecting air into the air chamber 44 to adjust air pressure in the air chamber 44.

At one end of the front tube 12 opposite to the rear tube 13, there is a front connection tube 11 fastening with the front tube 12 by means of a mechanical coupler 70 and a first seal ring 72. The front connection tube 11 has a first fast connector 112 formed at one end for connecting with an external piping system (such as a piping system in a building, not shown in the figure). Similarly, there is a rear connection tube 14 fastening with the rear tube 13 by means of another mechanical coupler 70 and another first seal ring 72, and has a second fast connector 142 for engaging with the external piping system.

For assembly and construction of the counterflow absorber 1 of this invention, firstly, the front tube 12 is fastened with the front connection tube 11 by means of a mechanical coupler 70. The rear tube 13 is fastened with the rear connection tube 142 by means of another mechanical coupler 70. The spring 38 is placed around the valve stem 34 then putting the valve stem 34 through the first bracket 122.

Then placing the inner tube 20 in the rear tube 13 and placing the piston board 41 between the inner tube 20 and the rear tube 13. Afterward the valve seat 42 is placed in the holding groove 131 and making forced contact with one end of the inner tube 20. Then the front tube 20 and the rear tube 30 are fastened together by means of yet another mechanical coupler 70 to complete the whole assembly.

When in use for normal flow, the valve 32 makes forced contact with the funnel groove 43 under the force of the spring 38. The funnel groove 43 is closed. When a pumping means (such as a pump, not shown in the figure) which has been connected with the rear connection tube 14 pumps water into the inner tube 20, pressurized water will push the valve 32 away from the funnel groove 43 to form a water passage through the opening 124 and front connection tube 11. Water may flow freely in the piping system.

When a counterflow happens (i.e., water hammering occurs) such as the pump stops operation abruptly, water in the piping system will drop down suddenly and incurs a huge impact force. The counterflow of water will force the valve 32 to close the funnel groove 43 and close the water passage. The facility (such as pump) at the pipe end thus will not directly receive the impact force and may be free from damage. Furthermore the counterflow impact force will be channeled to the buffer zone 45 through the passage 46 and absorbed by the piston board 41. The air in the air chamber 44 may provide additional buffer function to dampen vibration and reduce noise and protect the pipe end facility from damage.

The components of the embodiment set forth above are simple and easy to make. The material may be metal, non-metal, fiber glass, plastics and the like. The components may be assembled to a number of modules for final assembly and installation quickly. The positioning of the components or modules may be made precisely without adhering, soldering or welding. In order to provide more effective sealing, seal ring or O-ring may be added to the components where desired. Repair and replacement of these components and seal ring are easier and may be done with less time and cost.

Figure 2:
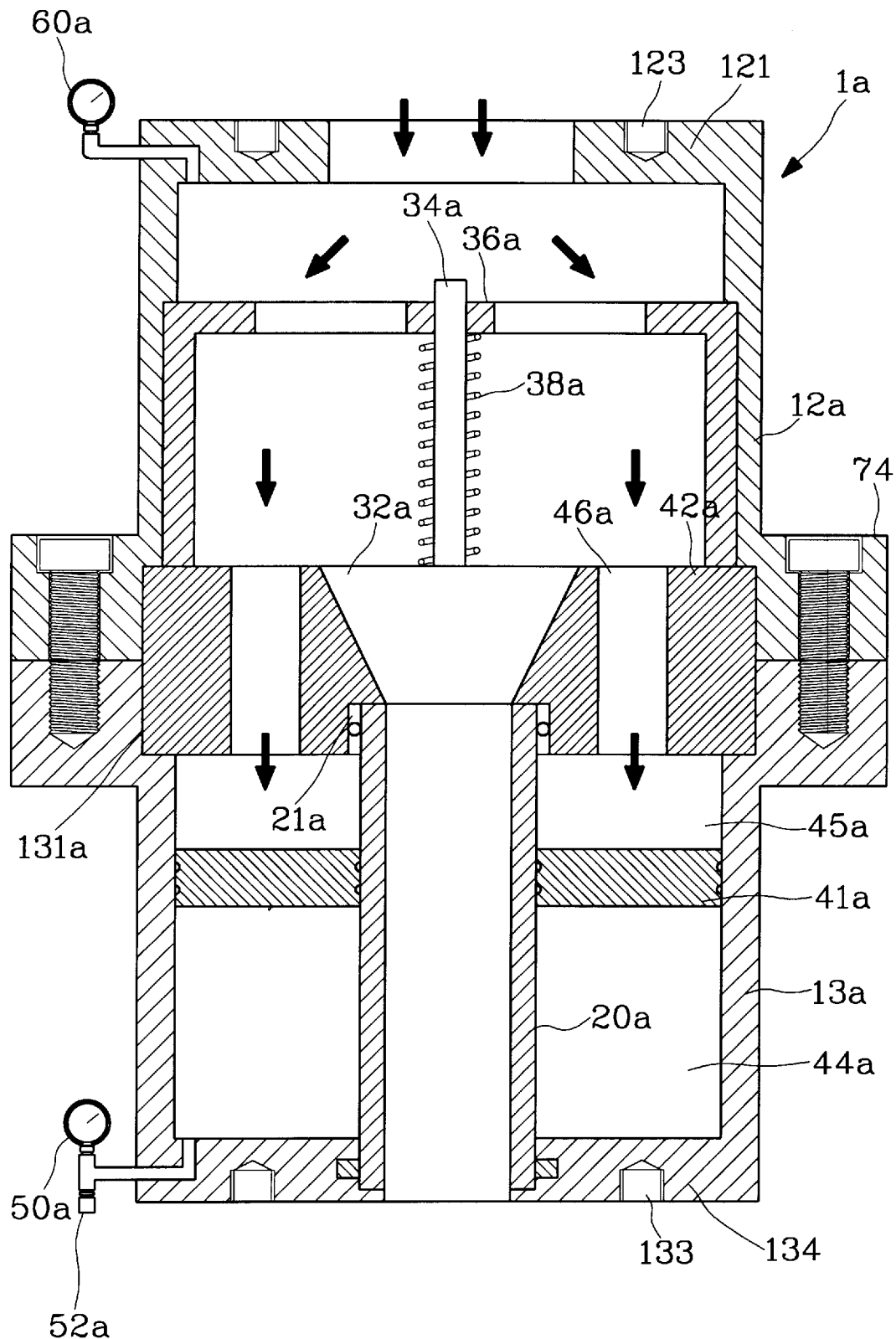
FIG. 2 is a sectional view of a second embodiment of this invention.

FIG. 2 illustrates a second embodiment of this invention. It is mostly constructed like the one shown in FIG. 1. Similar components will be marked by similar numerals but affixed with a character. The counterflow absorber 1a also includes a hollow outer tube, an annular valve seat 42a, an inner tube 20a, a valve means and an annular piston board 41a. The valve means includes a valve 32 attaching with a valve stem 34a which has a spring 38a surrounding thereon.

The outer tube also includes a front tube 12a and a rear tube 13a fastened together by a fastener. However instead of mechanical couple, the fastener constitutes screwing a pair of mating flanges 74 located at two contact ends of the front tube 12a and rear tube 13a. The other two ends of the front tube 12a and rear tube 13a opposite to each other are also formed respectively in flange heads 121 and 134 which has respectively a plurality of screw bores 123 and 133 for fastening with an external piping system (not shown in the figure). Hence the front connection tube and the rear connection tube may be dispensed with in this embodiment. Furthermore the bracket 36a for holding the valve stem 34a is a separate member housed in a holding groove formed in the front tube 12a with one end thereof adjacent the valve seat 42a. The bracket 36a may also be adhered to or forced engaged with the inside wall of the front tube 12a. Other components and structure are substantially same as the ones shown in FIG. 1, thus will be omitted here.

Figure 3:
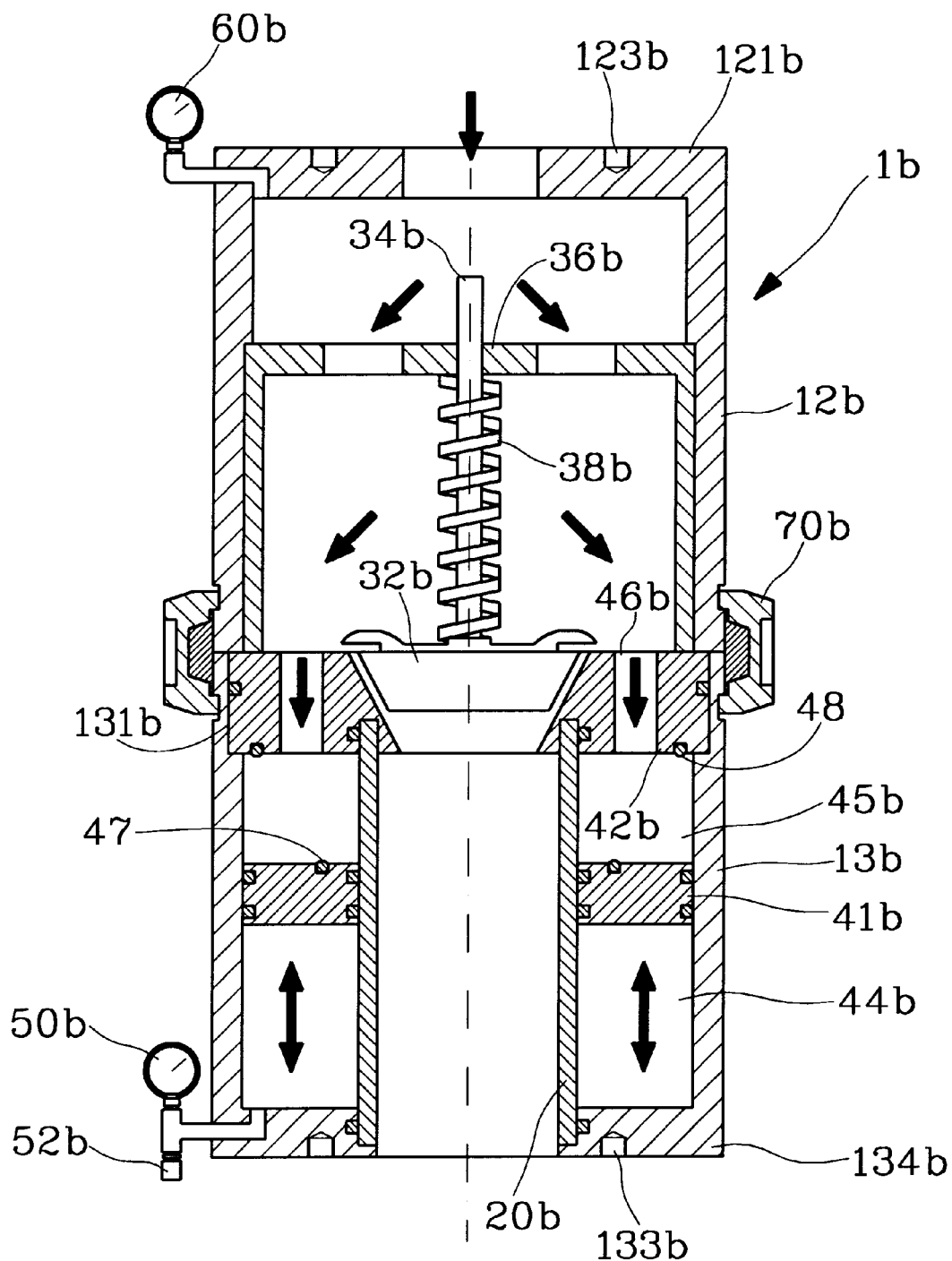
FIG. 3 is a sectional view of a third embodiment of this invention.

FIG. 3 shows a third embodiment of this invention. It also is constructed largely like the one shown in FIG. 2. Similar components will be marked by similar numbers but affixed with different characters. The front tube 12b and rear tube 13b are fastened together by means of a mechanical coupler 70b. The facing surfaces of the valve seat 42b and the piston board 41b have respectively disposed with a PU ring 48 and 47 to offer buffer function when the piston board 41b is moved up or down and making impact contact with the valve seat 42b when water hammering taking place. Such a structure may reduce noise and increase absorber durability.

Figure 4:
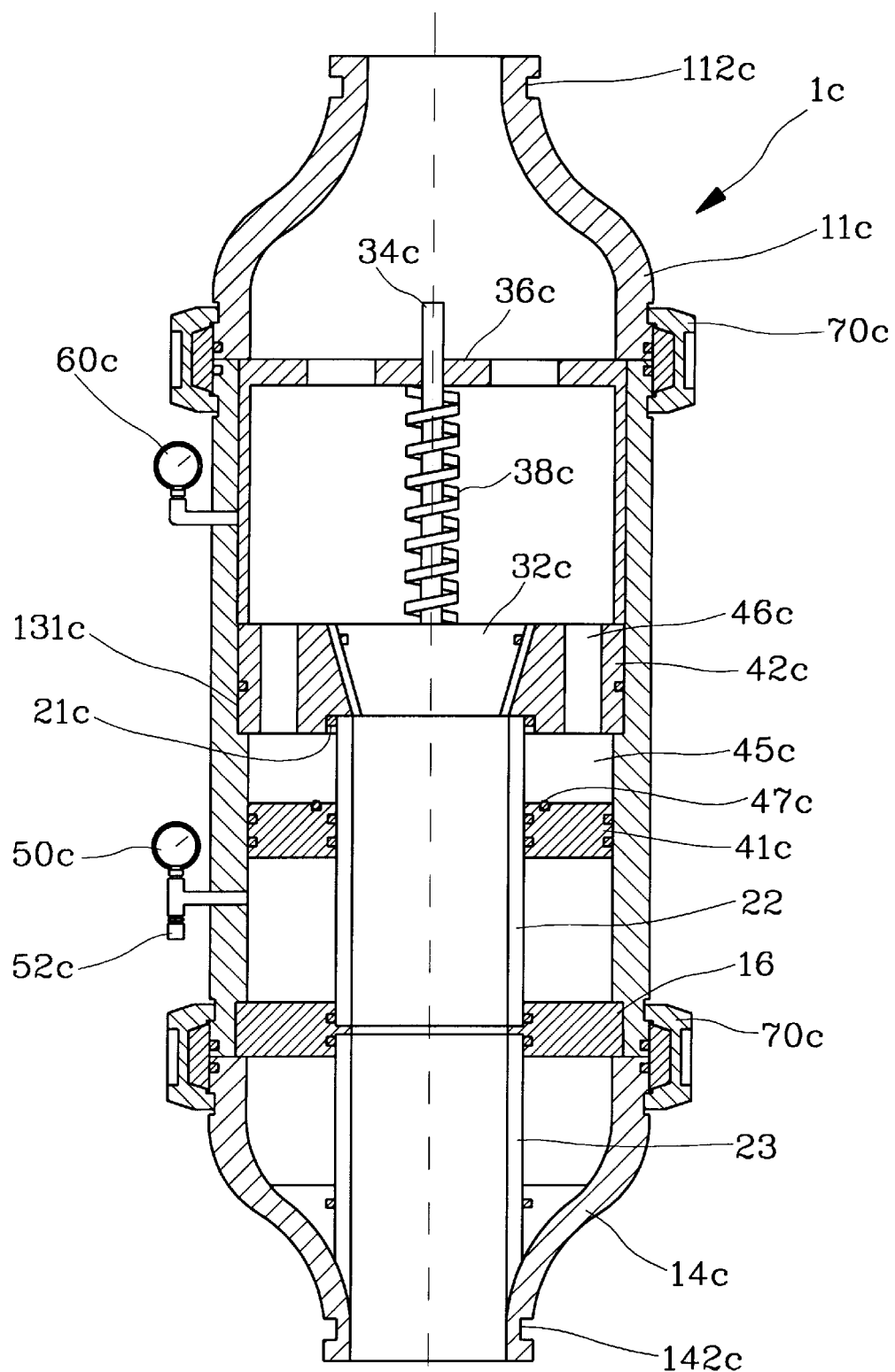
FIG. 4 is a sectional view of a fourth embodiment of this invention.

FIG. 4 depicts a fourth embodiment which is largely a combination of the embodiments shown in FIG. 1 and FIG. 3. The outer tube 15 is formed by a single tube rather than a combination of a front and a rear tube. However the inner tube is formed by fastening a front inner tube 22 with a rear inner tube 23 and has a seal member 16 surrounding the fastening juncture and making contact with the inside wall of the outer tube 15 to form an end of the air chamber. The outer tube 15 has two ends fastened respectively with a front connection tube 11c and a rear connection tube 14c for connecting with an external piping system. The fastening of the outer tube 15 and the connection tubes 11c and 14c are done by means of mechanical couples 70c. The connection tubes 11c and 14c have respectively a fast connector 112c and 142c for connecting with the external piping system through mechanical couplers. The connection may be done quickly at low cost. The piston board 41c also has a PU ring 47c disposed on a surface facing the valve seat 42c to serve as a buffer for reducing noise when hitting the valve seat 42c during water hammering.

It may thus be seen that the objects of the present invention set forth herein, as well as those made apparent from the foregoing description, are efficiently attained. While the preferred embodiments of the invention have been set for purpose of disclosure, modifications of the disclosed embodiment of the invention as well as other embodiment thereof may occur to those skilled in the art. Accordingly, the appended claims are intended to cover all embodiments which do not depart from the spirit and scope of the invention.

What is claimed is:

1. An I-type counterflow absorber connecting directly with a piping system for absorbing impact force and noise resulting from water hammering effect, said counterflow absorber comprising:
    a hollow outer tube including a front tube and a rear tube fastened together by a fastener;
    a valve seat located between the front and rear tube to divide interior of the outer tube in a front and a rear space having a funnel groove and at least one passage for communicating the front space with the rear space;
    an inner tube located in the rear tube having one end engaging with the funnel groove for channeling water flow from interior of the rear tube to the front tube;
    a valve means located in the front tube including a valve, a valve stem attached to the valve at one end thereof and a spring surrounding the valve stem, the valve stem passing through a bracket located in the front tube and movable therethorugh for the valve to close the funnel groove by means of the spring in a normal flow environment; and
    an annular piston board movably located between the inner tube and the rear tube to separate the space between the inner tube and rear tube in a buffer zone and an air chamber filled with air.

2. The I-type counterflow absorber of claim 1, wherein the front tube fastens a first fast connector at one end thereof for connecting with an external piping system and the rear tube fastens a second fast connector at another end thereof for connecting with another external piping system.

3. The I-type counterflow absorber of claim 2, wherein the inner tube has a first end engaging with one side of the funnel groove and a second end engaging with another end of the rear tube in vicinity of the second fast connector for the inner tube to be securely held in the rear tube.

4. The I-type counterflow absorber of claim 1, wherein the fastener is a mechanical coupler.

5. The I-type counterflow absorber of claim 1, wherein the fastener is a flange connector.

6. The I-type counterflow absorber of claim 1, wherein the bracket is integrally formed with the front tube at one end of the front tube and has at least one opening formed therein for water flowing therethrough.

7. The I-type counterflow absorber of claim 1, wherein the bracket is a separate member located in the front tube and has at least one opening formed therein for water flowing therethrough.

8. The I-type counterflow absorber of claim 1, wherein the front tube has a water flow pressure meter attached from outside and the rear tube has an air pressure gauge attached from outside thereof for measuring air pressure in the air chamber, the air pressure gauge having an air nozzle for injecting air into the air chamber to adjust air pressure in the air chamber.

9. An I-type counterflow absorber connecting directly with a piping system for absorbing impact force and noise resulting from water hammering, comprising:
    a hollow outer tube having a holding groove formed in an inside wall thereof;
    a valve seat located in the holding groove to divide interior of the outer tube in a front and a rear space, the valve seat having a funnel groove and at least one passage to communicate with the front and rear space;
    an inner tube means including a front inner the tube connecting with a rear inner tube with a seal member surrounding the connecting portion to enable the inner tube means to form a fluid passage therein, the seal member extending to inside wall of the outer tube, the front inner tube having one end engaging with the funnel groove for channeling water flow from the inner tube through the funnel groove to outer tube;
    a valve means located in the front space having a valve, a valve stem which has one end attached to the valve and a spring surrounding the valve stem, the valve stem passing through a bracket located at one end of the holding groove and being movable for the valve to close the funnel groove under spring force, the bracket having at least one opening for water to flow therethrough; and
    an annular piston board located between the inner tube means and the outer tube for dividing space between the inner tuber means and outer tube in a buffer zone and an air chamber filled with air, the piston board having a PU ring located on a surface facing the valve seat;
    wherein the outer tube have two ends connecting respectively with a front connection tube and a rear connection tube through mechanical couplers which clamp respectively around the bracket and seal member for positioning the counterflow absorber securely.

* * * * *